United States Patent Office 3,188,170
Patented June 8, 1965

3,188,170
PREPARATION OF SODIUM CARBONATE FROM CRUDE SODIUM BICARBONATE AND SODIUM CARBONATE MONOHYDRATE
John W. Mantz, Clyde B. Myers, and Cecil G. Sisson, Painesville, Ohio, assignors to Diamond Alkali Company, Cleveland, Ohio, a corporation of Delaware
No Drawing. Filed June 26, 1961, Ser. No. 119,321
10 Claims. (Cl. 23—63)

This application is a continuation-in-part of application Serial No. 389,865, filed November 2, 1953 and now abandoned.

This invention relates to the manufacture of alkali metal carbonates and sesquicarbonates. More particularly, this invention relates to a novel method for manufacturing alkali metal carbonates and sesquicarbonates in which the density and particle size of the products may be controlled over a relatively wide range of values, and in which a novel physical form of alkali metal carbonate or sesquicarbonate is produced, which form is characterized by free-flowing spheroidal particles of controllable bulk density.

In accordance with standard practices in the ammonia-soda process, sodium carbonate is obtained by calcining a crude sodium bicarbonate (commonly referred to as "ammonia-soda crystals"), which crude sodium bicarbonate may contain from about 12% to as much as 28% of water, together with relatively small amounts of ammonium carbonate and bicarbonate, sodium carbonate, ammonium chloride and sodium chloride. The crude sodium bicarbonate is calcined at temperatures above 100° C. and up to about 250° C., the latter temperature being measured at the discharge end of the calciner, in order to decompose the ammonium carbonate and bicarbonate to ammonia and carbon dioxide and water, and to convert the sodium bicarbonate to sodium carbonate, carbon dioxide, and water. The ammonia, carbon dioxide, and water are ordinarily removed from the calciners at a pressure slightly less than atmospheric pressure. The sodium carbonate thus produced is referred to in the industry as "light ash" and is the end product of the process.

Prior to packaging or storage, the sodium carbonate may be passed through a classifier in which the coarse and very fine particles are separated from one another, and a portion of the very fine particles, or "fines," may be recycled to the feed for the calciner, where it may be mixed with unclassified light ash and the wet crude sodium bicarbonate feed. The classifier may suitably be of the vibrating screen type, or an air classifier.

The primary purpose in recycling the calcined material in this manner is to control the moisture content of the feed going into the calciners, whereby scaling or sticking of the material undergoing calcination upon the walls of the calciners is prevented or lessened.

In order to produce the type of sodium carbonate commonly referred to in the industry as "dense ash," it has heretofore been standard practice to take a side stream of the light ash from the calciners, mix this material with an amount of water sufficient to form sodium carbonate monohydrate, and calcined the sodium carbonate monohydrate at temperatures of the order of those noted above, whereby coarse, relatively high density material is produced, associated with a comparatively small amount of fines.

In referring to the above-described materials as "light" or "dense" soda ash, the apparent bulk density is used as a means to designate a given material as light or dense. The apparent bulk density is determined by weighing a given volume of sodium carbonate, the bulk density of which is to be determined; the volume is measured with the material in loosely-packed condition, without exerting pressure such as tamping to remove the voids between the particles. The weight of this volume of the sodium carbonate is translated to terms of the weight of one cubic foot of material. In another expression of bulk density, the number of pounds per cubic foot is divided by the weight of one cubic foot of water, giving a non-dimensional arbitrary value. Sodium carbonate of commerce is generally considered to be light soda ash when its apparent bulk density is of the order of 30 lbs. to 45 lbs. per cubic foot, or in terms of this range to the weight of one cubic foot of water, a value from 0.5 to about 0.8. Similarly, dense soda ash refers to a commercial sodium carbonate having an apparent bulk density of about 60 lbs. to 65 lbs. per cubic foot, or values, in terms of one cubic foot of water, of 1.0–1.05.

Most users of soda ash in the cleaning and detergent industry prefer a dust-free material having relatively large particles and a low apparent bulk density, for example, 25 to 35 pounds per cubic foot. Most users of soda ash in the glass industry prefer a dust-free material having large particles and a high apparent bulk density, such as dense soda ash, but it is apparent that the added steps in manufacturing dense soda ash, i.e., hydration of light soda ash and the calcination of the hydrated material, add materially to the cost of its manufacture.

In order to overcome the apparent disadvantages of the physical properties of light soda ash, and to incorporate some of the advantages of the physical properties of dense soda ash, the industry has heretofore resorted to two expediencies which in themselves have failed to solve the problem. The first of these consists in screening the light soda ash from the calciners in order to remove the fines and leave only the larger particles. The second consists, again, in screening the light soda ash as it comes from the calciners, and combining the large particles of light soda ash with "fines" from the screening of the dense soda ash operation. By thus combining the fine screenings from the dense ash, a mixture of light and dense ash is obtained, which mixture has a bulk density ordinarily intermediate to that of either light or dense soda ash, depending upon the proportion of each of the components in the mixture. The principal difficulty in both of these expedients is that the proportion of large particles in the light soda ash and fines in dense soda ash is small and, therefore, the tonnage of material which can be produced is relatively small and uneconomical.

One of the objects of the present invention is to provide a novel method for manufacturing alkali metal carbonates.

Another object of the invention is to produce sodium carbonate having a particle size distribution of the order of that of dense soda ash, and a bulk density ranging from somewhat less than that of light soda ash to substantially less than that of dense soda ash.

A further object of the invention is to provide a method for manufacturing soda ash characterized by relatively large, spheroidal particles, which are free-flowing and relatively dust-free and whose apparent bulk density is readily controllable over a wide range.

A further object of the invention is to provide a method for manufacturing soda ash having bulk density characteristics of that of light ash and a particle size equal to or greater than that characteristic of dense ash at a cost less than that of producing dense soda ash.

These and other objects of the invention will be apparent from the description hereinafter.

Pursuant to the above objects, the present invention is directed to the method which comprises the steps of mixing together an alkali metal carbonate, an alkali metal bicarbonate, and water in a sequence such as to provide for hydration of said alkali metal carbonate and to bring said hydrated carbonate into contact with said alkali metal bicarbonate, thereby to form at least substantial amounts of alkali metal sesquicarbonate. This mixture containing alkali metal sesquicarbonate may thmen be rapidly heated to a temperature above that at which decomposition of said bicarbonate and said sesquicarbonate begins and said hydrated carbonate becomes anhydrous, and maintained at that temperature for a sufficient period of time to effect decomposition and formation of alkali metal carbonate. Alternatively, the mixture may be treated by a procedure to be described hereinbelow and alkali metal sesquicarbonate may be produced.

In addition to the term "apparent bulk density," defined hereinabove, the terms "alkali metal carbonate" and "alkali metal bicarbonate" are intended to include carbonate and bicarbonate salts of the alkali metals, lithium, sodium, potassium, cesium, and rubidium. Also, the terms "alkali metal carbonate equivalent," "soda ash equivalent," and "sodium carbonate equivalent," as used herein, are intended to mean the weight of hydrated alkali metal carbonate, alkali metal bicarbonate, or crude alkali metal bicarbonate, e.g., crude ammonia-soda crystals, necessary to form one mole of alkali metal carbonate (sodium carbonate) upon calcination at a temperature sufficiently high to decompose the bicarbonate and liberate water, carbon dioxide, and ammonia. The term "grossly held water" refers to water not chemically bound to or within a material as water of hydration, but present in the free state.

In the practice of the method of the present invention, some variations in conditions and proportions of reactants may be employed in order to control the density of the calcined product, as well as to control the amount of fines or dusting, and the particle size distribution thereof.

One of these variations, which will be described in connection with crude ammonia-soda crystals, i.e., crude sodium bicarbonate as obtained in the ammonia-soda process and containing the characteristic impurities noted hereinabove, is particularly applicable to the formation of a product of low bulk density. This variation consists in mixing anhydrous sodium carbonate, which may suitably be light ash, or dense ash fines, with sufficient additional water to form a hydrate of sodium carbonate, e.g., the monohydrate of sodium carbonate. For the monohydrate, the amount of water used is theoretically 18 parts by weight for every 106 parts by weight of anhydrous sodium carbonate, although in ordinary practice it may be as high as 23 parts of water to 106 parts of soda ash. The crude wet sodium bicarbonate crystals are combined with the hydrated sodium carbonate in proportions varying from five (5) or somewhat more soda ash equivalents of the crude bicarbonate per soda ash equivalent of the hydrated sodium carbonate, to about one (1) soda ash equivalent of bicarbonate per two (2) soda ash equivalents of hydrated sodium carbonate. The preferred ratio, when a material of low bulk density is desired, is between four and five soda ash equivalents of crude bicarbonate per soda ash equivalent of sodium carbonate monohydrate. When mixtures of these two ingredients are combined in a manner to bring about their thorough interspersi( and granulation, and the mixture thus formed is calcin at a sufficiently high temperature to insure evaporati( of grossly held water, decomposition of the bicarbon and sesquicarbonate and dehydration of the hydrat sodium carbonate, the calcined material obtained m have an apparent bulk density ranging from about ! lbs. per cubic foot to about 45 lbs. per cubic foot. Moi over, this material is a grainy, almost dustless, sodiu carbonate having a particle size distribution such th 65–100% is retained on a 100-mesh screen (Tyler's Serie manufactured by the W. S. Tyler Company, Clevelan Ohio) with upwards of 92% being retained on a 200-me screen.

A variation of the above process, again in terms of t use of crude ammonia-soda crystals, or crude wet sodiu bicarbonate from the ammonia-soda process, consists taking anhydrous sodium carbonate, suitably in the for of light soda ash or dense soda ash fines, combining tl material with sufficient water to form a hydrate, e.g., t monohydrate, which is then mixed with crude wet sodiu bicarbonate from the ammonia-soda process and wi anhydrous sodium carbonate, such as light ash, light a fines, or dense ash fines, the ingredients being brought 1 gether to form a uniform mixture and the mixture pass to a calciner wherein it is rapidly heated to a temperatu of the order of 200° C. in order to drive off water, carb( dioxide, and ammonia.

Again, the proportion of crude ammonia-soda cryst: to hydrated sodium carbonate may range from about 5 to about 1:2, in terms of soda ash equivalents, in whi instance the calcined product obtained may have an a parent bulk density substantially within the range of 30– lbs. per cubic foot, and a particle sized distribution su that from about 55% to about 95% is retained on a 1( mesh screen (Tyler Series) and upwards of about 80% about 95% or more is retained on a 200-mesh scree Where the ratio of crude bicarbonate to sodium c: bonate hydrate, in terms of sodium carbonate equivalen is maintained at 1:1, and the proportion of added a hydrous sodium carbonate is increased, for example, 0. to 1, or a range of proportions for the three ingredier of 1:1:0.25 to 1:1:1, the apparent bulk density genera increases and the amount of material retained on 1! and 200-mesh screens decreases.

A variation of the latter mode of procedure may effected by screening the material from the calciner, 1 example, by using a 150- to 200-mesh screen, or first air classifying the material and then screening as with 150- to 200-mesh screen, separating the material whi remains on the 150- to 200-mesh screen as the final pr( uct, and recycling the material finer than 150- to 2( mesh as the anyhdrous sodium carbonate which is co: bined with hydrated sodium carbonate and crude a: monia-soda crystals. By operating in this manner, t density of the coarse screened material may be increas to a value substantially within the range of approximat( 53 to 56 lbs. per cubic foot.

A preferred means by which the principles of t method of the present invention may be employed i cludes providing a suitable mixer, described hereinbelo to which are added water, crude wet sodium bicarbona and anhydrous sodium carbonate, either simultaneou: or in sequence, and preferably in the proportions stat hereinabove. These three ingredients are preferal mixed as rapidly as possible and in a manner such tl at least some hydration of the anhydrous sodium c: bonate is effected before or coincident with chemical i action of the various components of the crude sodit bicarbonate material with hydrated or anhydrous sodit carbonate. The mixture thus formed is passed to calciner wherein drying and decomposition take pla( liberating water, carbon dioxide, and ammonia. T calcined product may be screened or otherwise classifi as described hereinabove, and the fines or reject m terial may be recycled to the mixer as anhydrous sodium carbonate, or only a portion of such fines are reject material may be employed as recycle, the remaining portion being sent to the hydrator wherein the anhydrous sodium carbonate is mixed with water to form the hydrated sodium carbonate.

Although the chemical and physical changes which take place in the steps of the method of the present invention are not completely understood, some observations with respect to these changes have been made. For example, there is strong evidence, including X-ray diffraction data discussed hereinbelow, that a chemical reaction takes place between the moist or wet sodium bicarbonate and the hydrated sodium carbonate. The reaction seems to be similar to that between carbon dioxide and hydrated sodium carbonate, particularly sodium carbonate monohydrate, from which a double salt, sodium sesquicarbonate, $Na_2CO_3 \cdot NaHCO_3 \cdot 2H_2O$, is formed. Moreover, anhydrous sodium carbonate in contact with the sodium bicarbonate and sodium carbonate monohydrate apparently alters or retards this reaction between the bicarbonate and hydrated carbonate, as evidenced by the change in physical properties of the calcined mixture toward those of ordinary light soda ash with increasing amounts of anhydrous sodium carbonate in the mixture. Under the operating conditions used in this process, it can be shown that the double salt $Na_2CO_3 \cdot 3NaHCO_3$, described by Sundstrom et al. in U.S. Patent 1,473,259, is not formed.

The observations referred to above concern X-ray spectrograms of ammonia-soda crystals, sodium carbonate monohydrate, anhydrous sodium carbonate, sodium bicarbonate, $Na_2CO_3 \cdot 3NaHCO_3$, and sodium sesquicarbonate ($Na_2CO_3 \cdot NaHCO_3 \cdot 2H_2O$) as well as various mixtures of crude ammonia-soda crystals, sodium carbonate, and water, and of refined sodium bicarbonate, sodium carbonate and water.

The evidence presented by these spectrograms indicates (a) that a mixture of wet crude ammonia-soda crystals with sodium carbonate, and water slightly in excess of theoretical requirements for the monohydrate, results in a product containing sodium sesquicarbonate ($Na_2CO_3 \cdot NaHCO_3 \cdot 2H_2O$) and sodium bicarbonate, with some sodium carbonate monohydrate but no evidence of $Na_2CO_3 \cdot 3NaHCO_3$; also, the X-ray spectrograms of the starting materials of the mixtures show no indication of either sodium carbonate monohydrate or sodium sesquicarbonate, in the crude ammonia soda crystals, and no indication of sodium carbonate monohydrate in the sodium carbonate used; (b) that a dry mixture of equal weights of refined sodium bicarbonate and sodium carbonate, to which mixture water is added in excess of that required to form the monohydrate of sodium carbonate, results in a product containing sodium sesquicarbonate, with no evidence of the presence of sodium carbonate monohydrate or $Na_2CO_3 \cdot 3NaHCO_3$, and that the reaction between the bicarbonate and carbonate, after the addition of the water, has run its course within a period somewhat less than 5 minutes; (c) that a mixture of wet crude ammonia-soda crystals with hydrated sodium carbonate (sodium carbonate mixed with water in amount slightly in excess of theoretical requirements to form the monohydrate, the X-ray spectrogram of which shows both the monohydrate and anhydrous sodium carbonate) results in a product containing a mixture of sodium sesquicarbonate with some anhydrous sodium carbonate, and without evidence of the presence of sodium carbonate monohydrate or $Na_2CO_3 \cdot 3NaHCO_3$ in the mixture; (d) that a mixture of wet crude ammonia-soda crystals with sodium carbonate, in the ratio of 4:1 (in terms of soda ash equivalents), and water slightly in excess of theoretical requirements for the monohydrate, shows no evidence of the presence of $Na_2CO_3 \cdot 3NaHCO_3$, even after twenty-four hours.

When crude ammonia-soda crystals are used as the source of sodium bicarbonate in the method of the present invention, the ammonium carbonate and bicarbonate associated therewith, in reacting with the hydrated sodium carbonate to liberate ammonia, appear to have a favorable, rather than an unfavorable, effect upon the calcined product.

The substitution of anhydrous sodium carbonate, to be hydrated during the reaction, for hydrated sodium carbonate has a profound effect on the particle size of the product. A much coarser product is obtained when hydration takes place simultaneously with reaction with the bicarbonate. Comparable particle sizes can be obtained when using hydrated carbonate only by increasing the total amount of water (added water plus water of hydration) in the mix.

When anhydrous sodium carbonate is recycled from the classifier and added to the mixture, it has been found that the character of such recycled material affects the character of the calcined product. Thus, it has been found that when light soda ash is recycled to the process to be mixed with the hydrated sodium carbonate and crude sodium bicarbonate, the amount of fines in the product from the calciner increases somewhat in proportion to the amount of light ash used. For this reason, it is preferable that where such light ash is used, it be used in a proportion not greater than the soda ash equivalent of the hydrated sodium carbonate. Moreover, it has been found that where dense ash fines are recycled to the process as anhydrous sodium carbonate to be used as such, i.e., not to be hydrated, the density of the product issuing from the calciner increases correspondingly.

Variation of the ratio of sodium bicarbonate to hydrated sodium carbonate in the mixture, within the limits stated hereinabove, appears to have little effect on the quality and yield of the product when the total amount of water present is in suitable balance with the ratio; but for ease of control and economy of calcination, a ratio of between 4:1 and 5:1, in terms of soda ash equivalents, is preferable. It has been shown experimentally that the total heat necessary for drying and calcination of the mixture, starting at 25° C., reaches a minimum of about 42–44 kilocalories per mole in this concentration range.

A critical factor in product quality is the amount of water used. To obtain the most desirable product, i.e., one of which 75% or more passes through a 12 mesh screen and is retained on a 100 mesh screen and of which product 80% or more is retained on a 40 mesh screen, the water content must be between 13% and 30% of the total mix weight and is quite specific for any given ratio of bicarbonate to carbonate.

When hydration of the anhydrous sodium carbonate is to be carried out separately from the reaction in which the sesquicarbonate is formed, the hydrator may be any suitable reactor in which the anhydrous sodium carbonate may be mixed with water to effect hydration. For example, a double shaft pug mill, a cylindrical vessel in which are mounted rotating and stationary tines, a ribbon mixer, or the like, have been found suitable. When hydration of the anhydrous sodium carbonate is to be carried out in contact with sodium bicarbonate, such a ammonia-soda crystals, with concomitant formation of the sesquicarbonate, intimate, high-speed mixing is desirable to provide the proper degree of mixing of the sesquicarbonate mixture and consequently a high yield of product having the properties specified hereinbefore. An example of a suitable mixing apparatus is sold by the Strong-Scott Manufacturing Company of Minneapolis, under the registered trademark "Turbulizer." Such intimate mixing is always preferred for the reaction between hydrated sodium carbonate and bicarbonate. If a less efficient form of mixing is used, the mixing time must be increased.

In the course of the reaction between sodium bicarbonate, sodium carbonate monohydrate and water to form sodium sesquicarbonate, some heat is liberated so that the temperature of the mix rises to slightly above ambient temperature. However, if hydration of the anhydrous sodium carbonate is carried out in the presence of the ammonia-soda crystals by addition of water to the mixture, the temperature may rise to as high as 100° C. In actual practice, it has been possible to prepare substantial concentrations of $Na_2CO_3 \cdot 3NaHCO_3$ only by heating mixtures of sodium bicarbonate, sodium carbonate, and water for at least 96 hours at around 100° C. in a system substantially closed so that the very slow reaction takes place in an atmosphere saturated with carbon dioxide and water vapor. In the practice of the process of this invention, heating under such conditions of temperature, time, and environment is avoided. It will be readily seen that it is advantageous to reduce the mixing time to the absolute minimum which is consistent with good conversion to sesquicarbonate, which is under five minutes, and then to proceed as soon as possible to the calcining step, thereby avoiding any opportunity for formation of the undesirable $Na_2CO_3 \cdot 3NaHCO_3$.

Finally, the physical conditions under which calcination takes place change the physical properties of the calcined product. For example, calcination in an externally-fired rotary drum calciner, in which there is thorough agitation of the particles at all times with little opportunity for aggregates to form, results generally in a product of smaller particle size with higher bulk density than that obtained by calcination under less vigorous agitation, for example, such agitation as that provided by a rake or paddle stirrer immersed in a mass of the material being calcined.

In addition to the physical characteristics of the material produced by the method of the present invention, as well as the novel physical form of soda ash produced thereby, the unusual and unexpected results obtained by the method of the present invention arise in that although hydrated sodium carbonate, whether "wet" or "dry," is used in conjunction with the wet crude sodium bicarbonate crystals, the tendency of the mixture undergoing calcination to adhere to the walls of the calciner and interfere with the heat transfer characteristics thereof, decreases substantially to zero.

This is in marked contrast to normal operation of the calcining of crude wet sodium bicarbonate crystals in the ammonia-soda process, wherein it has been thought necessary over a period of years, and accordingly is the common practice in the industry, to provide an amount of anhydrous sodium carbonate (as regular light ash, or light ash fines) to be mixed with the wet sodium bicarbonate to control the moisture content thereof in order to lessen the tendency of the material undergoing calcination to adhere to the walls of the calciner. Moreover, in addition to the anhydrous sodium carbonate added to the wet crude sodium bicarbonate in order to control the moisture content thereof, it is common practice when calcining such crude sodium bicarbonate to provide within the calciner mechanical means, such as a chain, or the like, to dislodge any of the material which adheres tenaciously to the walls of the calciner. Thus, it is apparent that comparatively strong measures have heretofore been resorted to, in order to obtain less than complete control of scaling in the calciners, without improving, as the present invention does, the physical properties of the material undergoing calcination as well as the calcined product.

By eliminating the calcining step in the procedure described hereinabove, a product containing varying proportions of sodium bicarbonate, sodium carbonate, and sodium sesquicarbonate may be obtained. In particular, if the ratio of sodium bicarbonate to sodium carbonate, in terms of soda ash equivalents, is substantially 1:2, and the mixture wherein the formation of sesquicarbonate takes place is held for a period of time under conditions preventing loss of water and carbon dioxide, a product consisting essentially of pure sodium sesquicarbonate is obtained in the form of large, free-flowng spheroidal particles. This form is in contrast to that of the ordinary sesquicarbonate of commerce, which is made in aqueous solution and sold as fine needle-like crystals.

In order to prepare the unique physical form of sodium sesquicarbonate of this invention, crude ammonia-soda crystals are mixed with sodium carbonate monohydrate or with ordinary light ash and water, as described hereinabove. The mix is then aged in a suitable container which will prevent loss of water and carbon dioxide, at temperature from 20° to approximately 100° C., for suitable period of time (about 1 to 1½ hours at 75° C with longer times required at lower temperatures, e.g. 12 to 24 hours at room temperature). After the agin period is completed, the material is air-dried at a temperature of approximately 40° to 55° C., in order to remove grossly held water, but not the water of crystallization in the sesquicarbonate. The time required for drying is usually between 15 minutes and 2 hours, typical about ½ hour to 1 hour.

The product resulting from this procedure is in the form of large granules, similar to those of the form of soda ash produced by the methods set forth hereinbefore. X-ray spectrograms of the material prove to be composed essentially of sodium sesquicarbonate $Na_2CO_3 \cdot NaHCO_3 \cdot 2H_2O$. The particle size of the product is typically such that 90–99% is retained on a 10 mesh screen, and the apparent bulk density is in the range of 35–50 lbs. per cubic foot. Extended drying at temperatures not exceeding 55° C. causes little or no change the composition of the sesquicarbonate. If the agin time is insufficient, the product, after drying at 50° to 55° C., contains less than the theoretical amount of water and is probably a mixture of sodium carbonate monohydrate, sodium bicarbonate and sodium sesquicarbonate.

When the product is heated to about 65° C., continue slow loss of water accompanied by slow loss of carbon dioxide is noted. This is evidence of calcination of the sesquincarbonate to soda ash at the higher temperature.

In order that those skilled in the art may better understand the method of the present invention, the characteristics of the compositions produced thereby, and the preferred means by which the invention may be carried in effect, the following specific examples are offered:

EXAMPLE 1

Anhydrous sodium carbonate, in the form of light a fines (as described hereinabove), is placed in a rotating drum reactor and combined with a sufficient amount water theoretically to form the monohydrate of sodium carbonate. The hydrated sodium carbonate material a dry, free-flowing granular product, which is mixed with crude wet sodium bicarbonate obtained from the ammonia-soda process, which crude sodium bicarbonate has the following analysis:

| Ingredient: | Perce |
|---|---|
| $NaHCO_3$ | 73 |
| $Na_2CO_3$ | 4 |
| $NH_3$ calculated as ammonium bicarbonate | 3 |
| Water | 17 |

This crude wet sodium bicarbonate will yield, upon calcination at approximately 200° C., about half of its weight as anhydrous sodium carbonate or soda ash. The crude wet sodium bicarbonate and hydrated sodium carbonate are combined in the proportion of 8 parts of the crude wet bicarbonate to 5 parts of the hydrated sodium carbonate, i.e., a soda ash equivalent ratio of about 1: The materials are mixed as rapidly as possible in order form a homogeneous mixture, which requires about 4 minutes, whereupon the mixture is placed in a calcin consisting essentially of a cylindrical vessel having a sing paddle stirrer providing mild agitation; the mixture is calcined at a temperature of the order of 200° C., with the ensuing evolution of water, ammonia, and carbon dioxide This material is designated Sample A in the table below Another portion of the same crude sodium bicarbonate and a further portion of hydrated sodium carbonate prepared as in the material for Sample A above, are mixed together in the proportion of 1 part by weight of the crude wet sodium bicarbonate to 1 part by weight of the hydrated sodium carbonate, the mixing time being about 4–5 minutes, whereupon the mixture is passed to the same type of calciner, and calcined at a temperature of the order of 200° C., with the ensuing evolution of carbon dioxide, water, and ammonia. The data for this material appears in the table below under Sample B.

In order that Samples A and B may be compared with a typical product of commerce, the table below includes a typical screen analysis of commercial light ash and granular dense ash.

| Mesh | Product particle size distribution (cumulative percentages) | | | |
|---|---|---|---|---|
| | Sample A | Sample B | Light ash | Typical granular dense ash |
| On 20 | 4.7 | 2.7 | | 1.1 |
| 60 | 42.0 | 39.9 | | 73.3 |
| 80 | 54.3 | 57.1 | 6.2 | 88.6 |
| 100 | 65.5 | 69.6 | 12.6 | 93.4 |
| 150 | 75.8 | 79.2 | 29.5 | 96.5 |
| 200 | 94.2 | 94.0 | 56.8 | 98.9 |
| Thru 200 | 5.8 | 6.0 | 43.2 | 1.1 |
| Apparent bulk density, lbs./ft.$^3$ | 31.6 | 30.5 | 35.0 | 60.0 |

EXAMPLE 2

Crude wet sodium bicarbonate crystals obtained from the ammonia-soda process, and having substantially the same analysis as that described in Example 1 (i.e., the crude wet sodium bicarbonate yields 1 part of sodium carbonate from approximately 2 parts of the crude wet material), is mixed with hydrated sodium carbonate prepared as described in Example 1, and, in addition, with anhydrous sodium carbonate in the form of light soda ash. The proportions of crude wet sodium bicarbonate:hydrated sodium carbonate:light soda ash are 8:5:4, or a soda ash equivalent ratio of about 1:1:1. These three materials are mixed together in a double shaft pug mill, the mixing time being approximately 5 minutes, and the material issuing from the pug mill is passed to a calciner which is an externally fired, horizontal, rotating cylinder, wherein the mixture is calcined at a temperature of the order of 200° C. with the ensuing evolution of carbon dioxide, water, and ammonia. The material issuing from the calciner has the following particle size distribution and apparent bulk density:

Mesh:                        Cumulative percentages
- On 80 _____ 40
- 100 _____ 55
- 150 _____ 72
- 200 _____ 87
- Thru 200 _____ 13

Apparent bulk density, 43 lbs./ft.$^3$.

By increasing the proportion of hydrated sodium carbonate in the mixture, in the same type of calciner, the bulk density may be increased to as high as 52 lbs./ft.$^3$ with an increase in the amount of material retained on a 100-mesh screen.

EXAMPLE 3

Using the same type of crude wet sodium bicarbonate as that employed in Examples 1 and 2 above (i.e., 2 parts of a crude wet material yields 1 part of anhydrous sodium carbonate) hydrated sodium carbonate prepared as in Example 1 and anhydrous sodium carbonate, are combined in the proportion of 8 parts of the crude wet sodium bicarbonate, 5 parts of hydrated sodium carbonate, and 4 parts of light ash fines. The components are thoroughly mixed in a double shaft pug mill, the mixing time being approximately 5 minutes, and the material issuing from the pug mill is passed to a calciner of the type described in Example 2, in which the mixture is heated to a temperature of the order of 200° C. with the ensuing evolution of carbon dioxide, water, and ammonia. The material issuing from the calciner is first passed through an air classifier which removes substantially all the material of a particle size which will pass a 200-mesh screen, and this fine particle size material is recycled to the mixer as anhydrous sodium carbonate. From the air classifier, the material then passes to a screen classifier wherein particles which pass a 150-mesh screen are separated from the material retained on a 150-mesh screen. The material passing the 150-mesh screen is classed as fines and is returned to the sodium carbonate hydrator and employed therein in a combination with commercial light ash to form the hydrated sodium carbonate. The material retained on 150-mesh screen is characterized by a particle size such that about 70–75% is retained on an 80-mesh screen and up to about 90% of the material is retained on a 100-mesh screen. The bulk density of this material in the ordinary course of manufacture ranges from about 52 lbs./ft.$^3$ to about 55 lbs./ft.$^3$.

EXAMPLE 4

Following the procedure of the three pervious examples, a crude wet sodium bicarbonate of the same soda ash equivalents, sodium carbonate fines, and water are separately fed to a mixer in the proportion of 80 parts of the crude bicarbonate material, 40 parts of sodium carbonate fines, and water somewhat in excess of the theoretical amount required to combine with the sodium carbonate fines to form the sodium carbonate monohydrate, specifically about 7 parts of water. The mixture of the three ingredients, although granular and comparatively free-flowing, is damp to the touch, and is readily packed to a firm coherent mass. This material is calcined in the manner described in Example 1 above, and the material from the calciner has a bulk density in the range of 32–35 lbs./cu.ft., with a particle size distribution of the same order of magnitude for material retained on the 100 and 200 mesh screens.

EXAMPLE 5

A series of mixtures is prepared in which crude wet ammonia-soda crystals, hydrated sodium carbonate prepared as in Example 1, and anhydrous sodium carbonate in the form of light soda ash are combined in the proportions of 80 parts by weight of the ammonia-soda crystals and 50 parts by weight of the hydrated sodium carbonate (a 1:1 soda ash equivalent ratio) with differing proportions of light soda ash as indicated in the table below. These mixtures are calcined at a temperature of the order of 200° C. in a calciner of the type used in Example 1 above. Particle size distribution and apparent bulk densities of the calcined products are given in the following table:

| Screen mesh | Parts of light soda ash by weight (cumulative percentages on screen sizes) | | |
|---|---|---|---|
| | 10 | 30 | 40 |
| On 80 | 47.6 | 38.1 | 39.9 |
| 100 | 64.5 | 56.8 | 55.0 |
| 150 | 82.8 | 76.1 | 72.0 |
| 200 | 94.6 | 90.1 | 86.8 |
| Thru 200 | 6.4 | 9.9 | 13.2 |
| Apparent bulk density, lbs./cu. ft. | 30 | 34.5 | 36.5 |

By calcining the bicarbonate, hydrated sodium carbonate, and anhydrous carbonate mixtures as obtained above, in an externally fired rotating drum type calciner, bulk densities increase to about 35, 39, and 43 lbs./cu. ft. respectively.

EXAMPLE 6

Eighty parts by weight of crude ammonia-soda crystals (2 parts of the crude crystals yielding about 1 part anhydrous sodium carbonate) are combined with 10 parts by weight of water. To this mixture are added 40 parts by weight of hot anhydrous sodium carbonate (about 180° C.) and the whole mass is agitated with a single-shaft paddle-type mixer for a period of three minutes.

Eighty parts by weight of crude ammonia-soda crystals (2 parts of the crude crystals yielding about 1 part anhydrous sodium carbonate) are combined with 40 parts by weight of hot anhydrous sodium carbonate (about 180° C.) followed by agitation of the whole mass in a paddle-type mixer, concurrently with the addition thereto of 10 parts by weight of water.

These mixtures are designated C and C–I respectively in the table below.

These mixtures are calcined at a temperature of the order of 200° C., in a calciner of the type used in Example 1. Particle size distribution and apparent bulk density of the calcined materials are compared in the table below with the product (A) obtained as described in Example 1 (designated A):

| Screen mesh | Cumulative percentages on screen sizes | | |
|---|---|---|---|
| | C | C–I | A |
| On 20 | 2.1 | 1.3 | 4.7 |
| 80 | 67.4 | 44.0 | 54.3 |
| 100 | 75.9 | 60.2 | 65.5 |
| 150 | 86.7 | 79.5 | 75.8 |
| 200 | 94.6 | 92.0 | 94.2 |
| Thru 200 | 5.4 | 8.0 | 5.8 |
| Apparent bulk density, lbs./cu. ft | 32.3 | 31.3 | 31.6 |

EXAMPLES 7–14

Crude wet sodium bicarbonate, obtained from the ammonia-soda process, is weighed into a bowl of a mixer having contrarotating, vertically disposed beaters, and anhydrous sodium carbonate, in the form of light ash fines, is added in an amount to provide the ratios specified in the table hereinbelow (all ratios in terms of soda as equivalents. The mixer is started at a speed of approximately 400 revolutions per minute, and water is added rapidly from a 100 ml. burette at room temperature. Mixing is continued for approximately 5 minutes, of which time the water addition requires about the first minute. The mixer bowl is rotated against the pull of the beaters during the mixing cycle. The product is then calcined in a rotary dryer at a temperature of 200° C. for about 75 minutes.

A slightly different procedure is used for the preparation of the material of Example 14. In this example the required quantity of light ash is weighed into the mixer bowl and the correct amount of water to form the monohydrate, plus 20% excess, is mixed with the ash. After about 1 to 2 minutes of mixing, the bicarbonate is added and the above procedure is then followed. The following table gives physical data pertaining to the samples of soda ash prepared by this method.

| Example | Ratio, bicarbonate:monohydrate | Total water, percent | Product, percent [1] | Product particle size distribution (cumulative percentages) on— | | | | Apparent bulk density, lbs./cu. ft |
|---|---|---|---|---|---|---|---|---|
| | | | | 20 | 40 | 80 | 100 | |
| 7 | 1.8:1 | 22.0 | 91.5 | 5.1 | 22.3 | 66.5 | 97.1 | 2? |
| 8 | 1.8:1 | 23.4 | 89.5 | 57.7 | 98.8 | 99.6 | 99.7 | 2? |
| 9 | 1.8:1 | 23.6 | [2] 78.4 | | | | | 3? |
| 10 | 4:1 | 13.0 | 95.1 | 3.5 | 49.8 | 91.0 | 97.9 | 2? |
| 11 | 4:1 | 13.6 | 94.0 | 8.6 | 68.3 | 97.9 | 99.6 | 2? |
| 12 | 4:1 | 14.8 | 84.4 | 64.7 | 98.7 | 99.1 | 99.6 | 3? |
| 13 | 4:1 | 15.3 | [2] 80.9 | | | | | 3? |
| 14 [3] | 4:1 | 14.8 | 92.7 | 10.4 | 85.5 | 96.9 | 98.6 | 3? |

[1] Percentage of material passing through 12-mesh screen and retained on 100-mesh screen (but see Note).
[2] Product retained on 12-mesh screen.
[3] Made with sodium carbonate monohydrate.

These examples show the profound effect of water content on the physical properties of the soda ash product. The optimum conditions are exemplified by Examples 10 and 12; that is, a product yield of the order of 85% or higher, with greater than 85% of this product being retained on a 40-mesh screen.

EXAMPLES 15–25

The following series of examples shows the effect of bicarbonate-carbonate ratio on product quality. The conditions of mixing and calcining are identical with those described in Examples 7–13. In each of the following examples, the optimum quantity of water is determined according to the procedure described in Examples 7–1?

| Example | Ratio, bicarbonate:monohydrate | Total water, percent | Product, percent | Product particle size distribution (cumulative percentages) on— | | Apparent bulk density, lbs./cu. ft |
|---|---|---|---|---|---|---|
| | | | | 40 | 60 | |
| 15 | 1:2 | 24.7 | 91.7 | 71.0 | 97.8 | 3? |
| 16 | 1:1.67 | 27.8 | 78.5 | 98.9 | 99.8 | 3? |
| 17 | 1:1 | 30.9 | 91.6 | 93.9 | 99.8 | 2? |
| 18 | 1.4:1 | 26.8 | 82.8 | 99.1 | 99.6 | 2? |
| 19 | 1.8:1 | 23.4 | 89.5 | 98.8 | 99.6 | 2? |
| 20 | 2.4:1 | 18.6 | 91.2 | 98.2 | 99.5 | 3? |
| 21 | 3:1 | 17.5 | 92.9 | 86.7 | 98.4 | 2? |
| 22 | 4:1 | 14.8 | 84.4 | 98.8 | 99.2 | 3? |
| 23 | 5:1 | 14.0 | 88.3 | 97.5 | 98.2 | 3? |
| 24 | 6:1 | 16.1 | 87.6 | 88.9 | 94.9 | 2? |
| 25 | 7:1 | 16.7 | 87.7 | 86.3 | 94.2 | 2? |

These results show that above the ratio, in terms of soda ash equivalents, of 1:2, product yield, particle size and bulk density are relatively independent of reactant ratio provided the optimum amount of water for any given ratio is used.

EXAMPLE 26

Anhydrous sodium carbonate, in the form of light ash fines, is fed continuously to a horizontally disposed rotating drum reactor together with slightly more than sufficient water (20% by weight of the light ash) to assure formation of the monohydrate, the water being sprayed into the drum in such a manner that the spray impinges upon both the wall of the reactor and the light ash fines therein. During mixing of the light ash fines and water the temperature rises, due to the heat of hydration, to between 100°–106° C., and is maintained within this range for a short period during passage of material through the reactor, after which the mixture is contacted with cool air (room temperature) to assist in evaporation of a portion of the excess water and cause flash crystallization of the monohydrate and control grain size of the hydrate to 0.02–0.03 inch particles.

The hydrated material is then discharged continuously into a mixer with crude ammonia-soda crystals, the ingredients and their amounts being substantially the same as those of Example 1 hereinabove, in the proportion of 8 parts of the crude ammonia-soda crystals by weight to 5 parts of the sodium carbonate monohydrate, the residence time of the ingredients in the mixer being of the order of 1–2 minutes.

From the mixer the material is fed continuously, together with light ash fines (5–10% of the weight of the material being discharged from the mixer), to an externally heated rotary drum type calciner (6 ft. by 80 ft.) from which calcined material is discharged at about 200° C., and passed to a screening station where the fine particles (those that pass through a 60 mesh screen) are removed.

The calcined material is found to contain spheroidal particles, not easily friable, and to have the physical properties shown in the following tables, compared with other forms of other chemically similar materials, the material of this example being designated "Sample D."

*Angle of repose*

| | | |
|---|---|---|
| Sample D | deg | 37 |
| Dense ash | deg | 42 |
| Light ash | deg | 59 |

*Solubility rate*

[60 gms. in 200 ml. $H_2O$]

| | | |
|---|---|---|
| Sample D | sec | 22 |
| Light ash | sec | 26 |
| Dense ash | sec | 47 |

*Typical bulk density*

| | Lbs./cu. ft., loose | Lbs./cu. ft., packed | Lbs./cu. ft., increase |
|---|---|---|---|
| Sample D | 31.9 | 37.6 | 5.7 |
| Light ash | 35.8 | 50.5 | 14.7 |
| Sodium sesquicarbonate (crystallized from solution) | 48.8 | 61.2 | 12.4 |
| Dense ash | 62.0 | 74.7 | 12.7 |

*Relative absorption*

WEIGHT PERCENT—NONIONIC SURFACTANTS

| | Percent |
|---|---|
| Sample D | 30 |
| Light ash | 18 |
| Dense ash | 5 |
| Sodium bicarbonate | 4 |
| Metasilicate (crystallized) | 3 |

*Absorbing power of Sample D.*—In each instance the percentages represent the amount of material which can be absorbed and still have a dry free-flowing solid.

| | Percent |
|---|---|
| Liquid nonionic surfactants; typical products: Triton X–100, Kyro EO, Igepal CO–630, OP–10, Sterox CD, Teox 120 | 30 |
| Cationic (quaternary ammonium) liquids: 50% alkyl tolyl methyl trimethyl ammonium chloride | 30 |
| Dodecyl benzene sulfonic acid | 35 |
| Sequestering agents: 40% solution of ethylene diamine tetra-acetic acid, sodium salt | 31 |
| Distilled tall oil, red oil, oleic acid (each) | 30 |
| Pine oil | 24 |
| Liquid silicate | 30 |
| Miscellaneous: | |
| Glycerine | 36 |
| Mineral spirits | 37.5 |
| Motor oil | 35 |
| Perchloroethylene | 35 |

EXAMPLE 27

Two kilograms of light soda ash, 2.03 kg. of crude sodium bicarbonate in the form of ammonia-soda crystals, and 975 cc. of water are mixed for 2–3 minutes. The mixer discharge is aged in closed bottles for two hours at 75° C. and then dried in a roll-mounted horizontal dryer rotating at about 30 r.p.m. Compressed air at a temperature of about 75° C. is fed into the dryer during the 2½-hour drying period; the maximum temperature of the mix is 40° C.

By this procedure, there is obtained a granular form of sodium sesquicarbonate having the following properties:

| Mesh: | Product particle size distribution (cumulative percentages) |
|---|---|
| (Sample E) | |
| On 20 | 11.2 |
| (Sample F) | |
| On 40 | 49.5 |
| On 60 | 81.2 |
| On 100 | 94.7 |
| Thru 100 | 5.3 |

APPARENT BULK DENSITY, LBS./CU. FT.

| | |
|---|---|
| Sample E | 40.0 |
| Sample F | 48.1 |

Analysis:

| | Actual percent by weight | Calculated percent by weight |
|---|---|---|
| $Na_2O$ | 41.1 | 41.1 |
| $CO_2$ | 39.0 | 38.9 |

EXAMPLES 28–32

Crude sodium bicarbonate from the ammonia-soda process, anhydrous sodium carbonate in the form of light ash fines, and water are mixed as described in Examples 7–13. The ratio of bicarbonate to carbonate, in terms of soda ash equivalents, is 1:2, which is the correct ratio for the formation of sodium sesquicarbonate. The products after mixing are aged at 75° C. in closed containers for various periods of time and dried at 50° C., to remove the grossly held water. The following table shows the effect of aging on the analysis of the final product.

| Example | Aging time, min. | Analysis, percent | |
|---|---|---|---|
| | | $Na_2O$ | $CO_2$ |
| 28 | 0 | 43.3 | |
| 29 | 30 | 42.4 | |
| 30 | 60 | 41.8 | |
| 31 | 90 | 41.2 | 39.3 |
| 32 | 120 | 41.2 | 39.1 |
| Calculated values for— $Na_2CO_3 \cdot NaHCO_3 \cdot 2H_2O$ | | 41.15 | 38.49 |

It is readily seen from the above data that in Examples 28–30 the Na₂O content is too high for a properly constituted sodium sesquicarbonate, indicating insufficient carbon dioxide or water, or both, in the dried material, and so demonstrating the unusual tendency for this specific mixture to release carbon dioxide and water under the conditions employed for mixing and drying.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of manufacturing sodium carbonate which consists of the steps of mixing a hydrated sodium carbonate with sodium bicarbonate, the proportion of said bicarbonate to said hydrated carbonate, in terms of sodium carbonate equivalents, being substantially within the range of 5:1 to 1:2, thereby to form in the mixture at least substantial amounts of sodium sesquicarbonate; rapidly heating the mixture thus formed to a temperature above that at which decomposition of said bicarbonate and sesquicarbonate begin and said hydrated carbonate becomes anhydrous, and maintaining this temperature for a sufficient period of time to effect decomposition of said mixture thus formed; removing carbon dioxide and water evolved from said mixture during said heating and recovering the sodium carbonate thus produced, which product is characterized by larger particles than those obtained by the calcination of an alkali metal bicarbonate alone, and a bulk density within the range of about 25–45 pounds per cubic foot.

2. The method of claim 1 in which anydrous sodium carbonate is added to the mixture of said hydrated carbonate and said sodium bicarbonate, resulting in the formation of a product with a bulk density within the range of 30–52 pounds per cubic foot.

3. The method of manufacturing sodium carbonate which consists of the steps of mixing sodium bicarbonate and sodium carbonate with sufficient water to form a hydrate of sodium carbonate, the proportion of said bicarbonate to said hydrated carbonate, in terms of sodium carbonate equivalents, being substantially within the range of 5:1 to 1:2, thereby to form in the mixture at least substantial amounts of sodium sesquicarbonate; rapidly heating the mixture thus formed to a temperature above that at which decomposition of said bicarbonate and sesquicarbonate begin and said hydrated carconate becomes anhydrous, and maintaining this temperature for a sufficient period of time to effect decomposition of said mixture thus formed; removing carbon dioxide and water evolved from said mixture during said calcining and recovering the sodium carbonate product thus produced, which product is characterized by larger particles than those obtained by the calcination of sodium bicarbonate alone, and a bulk density within the range of 25–45 lbs. per cubic foot.

4. The method of manufacturing sodium carbonate which consists of the steps of mixing together crude sodium bicarbonate in the form of wet ammonia-soda crystals and solid sodium carbonate monohydrate, the proportion of said ammonia-soda crystals to said monohydrate, in terms of sodium carbonate equivalents, being substantially within the range of 5:1 to 1:2, thereby to form in the mixture at least substantial amounts of sodium sesquicarbonate; rapidly heating the mixture to a temperature substantially above that sufficient to dehydrate said mixture and evolve carbon dioxide, ammonia, and water, and up to 250° C., and maintaining this temperature for a sufficient period of time to effect decomposition of said mixture thus formed; and recovering the sodium carbonate product thus produced, which product is characterized by larger particles than those obtained by the calcination of an alkali metal bicarbonate alone, and a bulk density within the range of 25–45 pounds per cubic foot.

5. The method of claim 4 in which anhydrous sodium carbonate is present in the mixture of ammonia-soda crystals and said sodium carbonate monohydrate, and resulting in the formation of a product with a bulk density within the range of 30–52 pounds per cubic foot.

6. The method of manufacturing sodium sesquicarbonate which consists of the steps of mixing a hydrated sodium carbonate with sodium bicarbonate, the proportion of said bicarbonate to said hydrated carbonate, in terms of sodium carbonate equivalents, being about 1:2; aging the mixture at about 20–100° C. under conditions preventing the loss of water and carbon dioxide from the mixture, thereby to effect substantially complete conversion to sodium sesquicarbonate; and drying said sesquicarbonate to remove grossly held water at a temperature below that at which decomposition of said sesquicarbonate begins.

7. The method of manufacturing sodium sesquicarbonate which consists of the steps of mixing sodium bicarbonate and sodium carbonate with sufficient water to form a hydrate of sodium carbonate, the proportion of said bicarbonate to said hydrated carbonate, in terms of sodium carbonate equivalents, being about 1:2; aging the mixture at about 20–100° C. under conditions preventing the loss of water and carbon dioxide from the mixture, thereby to effect substantially complete conversion to sodium sesquicarbonate; and drying said sesquicarbonate to remove grossly held water at a temperature below that at which decomposition of said sesquicarbonate begins.

8. The method of manufacturing sodium sesquicarbonate which consists of the steps of mixing together crude sodium bicarbonate in the form of wet ammonia soda crystals and solid sodium carbonate monohydrate the proportion of said ammonia-soda crystals to said monohydrate, in terms of sodium carbonate equivalents being about 1:2; aging the mixture in a closed container at about 20–100° C. for at least about one hour, thereby to effect substantially complete conversion to sodium sesquicarbonate; and drying said sesquicarbonate to remove grossly held water at a temperature of about 40–55° C.

9. The method of manufacturing sodium sesquicarbonate which consists of the steps of mixing together crude sodium bicarbonate in the form of ammonia-soda crystals, sodium carbonate, and sufficient water to form a hydrate of sodium carbonate, the proportion of said ammonia-soda crystals to said hydrated carbonate, in terms of sodium carbonate equivalents, being about 1:2; aging the mixture in a closed container at about 20–100° C for at least one hour, thereby to effect substantially complete conversion to sodium sesquicarbonate; and drying said sesquicarbonate to remove grossly held water at a temperature of about 40–55° C.

10. Solid sodium carbonate prepared according to the method of claim 1, said sodium carbonate being composed of free-flowing spheroidal granular particles having a high absorption capacity, a particle size such that about 65–100% is retained on a 100-mesh screen and more than about 92% is retained on a 200-mesh screen, and an apparent bulk density between about 25 and 45 lbs. per cubic foot.

References Cited by the Examiner

UNITED STATES PATENTS

| | | | |
|---|---|---|---|
| 243,991 | 7/81 | Solvay | 23—6 |
| 1,473,259 | 11/23 | Sundstrom | 23—6 |
| 1,583,663 | 5/26 | Sundstrom | 23—6 |
| 1,911,794 | 5/33 | Britton | 23—6 |
| 2,267,136 | 12/41 | Robertson | 23—6 |

MAURICE A. BRINDISI, *Primary Examiner.*

GEORGE D. MITCHELL, *Examiner.*

UNITED STATES PATENT OFFICE
CERTIFICATE OF CORRECTION

Patent No. 3,188,170                                              June 8, 1965

John W. Mantz et al.

It is hereby certified that error appears in the above numbered patent requiring correction and that the said Letters Patent should read as corrected below.

Column 9, line 63, for "ash" read -- as --; column 14, lines 65 to 75, in the table, last column, line 6 thereof, for "38.49" read -- 38.94 --; column 15, line 49, for "carconate" read -- carbonate --.

Signed and sealed this 25th day of January 1966.

(SEAL)
Attest:

ERNEST W. SWIDER                                  EDWARD J. BRENNER
Attesting Officer                                     Commissioner of Patents